Mar. 13, 1923.
R. W. DULL.
WASHING AND SCREENING APPARATUS.
FILED MAY 27, 1918.
1,447,970.
2 SHEETS—SHEET 1.
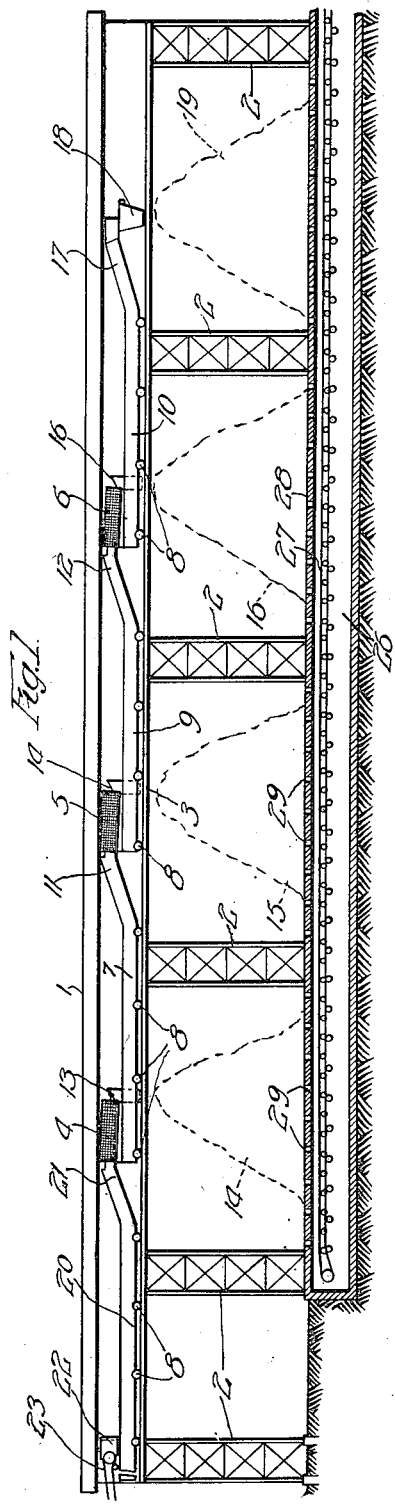
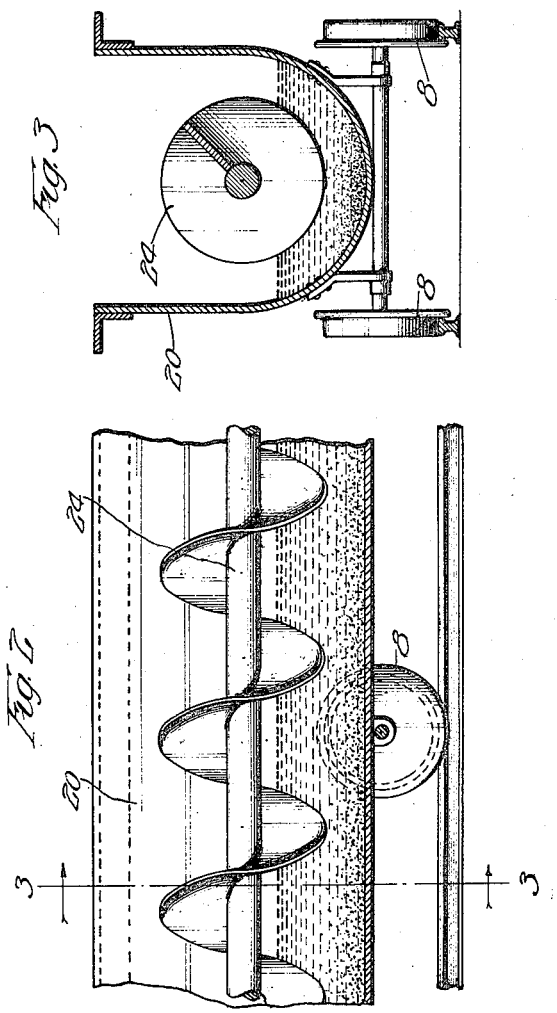
Inventor
Raymond W. Dull
By Arthur W. Anaud
Atty.

Mar. 13, 1923.
R. W. DULL.
WASHING AND SCREENING APPARATUS.
FILED MAY 27, 1918.
1,447,970.
2 SHEETS—SHEET 2.
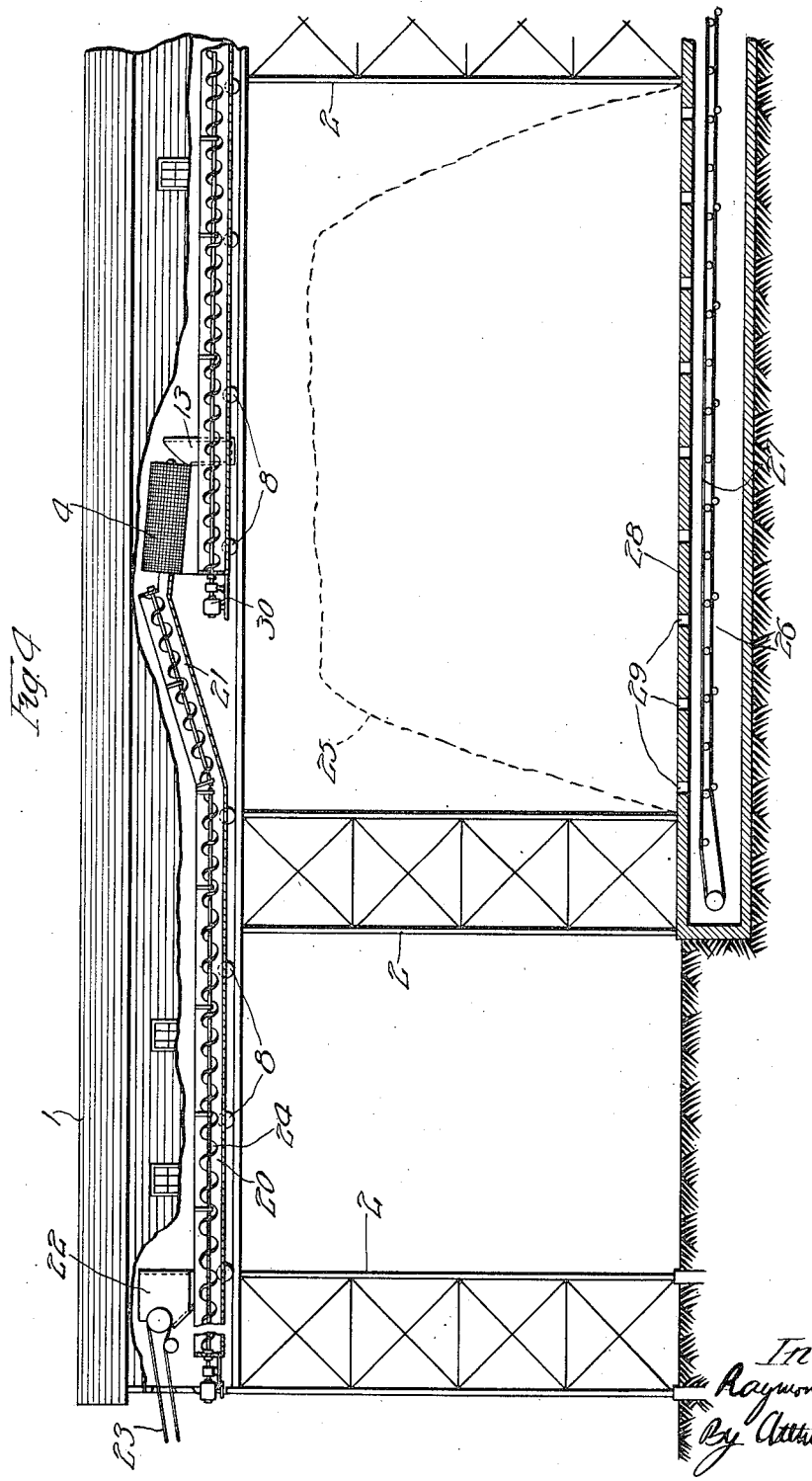

Patented Mar. 13, 1923.

UNITED STATES PATENT OFFICE.

RAYMOND W. DULL, OF LA GRANGE, ILLINOIS.

WASHING AND SCREENING APPARATUS.

Application filed May 27, 1918. Serial No. 236,902.

*To all whom it may concern:*

Be it known that I, RAYMOND W. DULL, a citizen of the United States of America, and resident of La Grange, Illinois, have invented a certain new and useful Improvement in Washing and Screening Apparatus, of which the following is a specification.

This invention relates to washing and screening apparatus of that kind in which the sand and gravel are subjected to successive washing and screening operations in a series of screens, preferably of the rotary type, so that the sand and gravel are graded according to size or fineness and accumulated in separate piles, the pile below the first screen being composed of the very coarse gravel, and the second pile below the next screen being composed of the next smaller size of gravel, and so on, until the fine sand is discharged from the end of the apparatus to form the last pile.

Generally stated, the object of the invention is to provide a novel and improved washing and screening apparatus of the foregoing general character.

A special object is to provide an improved construction and arrangement whereby an inclined position of the apparatus is not necessary in order to cause a continuous forward flowing motion of the sand and gravel and water, whereby practically the entire apparatus can be disposed in horizontal position, so that, as one advantage, the first screen is no greater distance above ground than the last or final screen.

It is also an object to provide certain details and features of construction and combinations tending to increase the general efficiency and desirability of a screening apparatus of this particular construction.

To these and other useful ends the invention consists in matters hereinafter set forth and claimed, and shown in the accompanying drawings, in which—

Fig. 1 is a side elevation, in diagrammatic form, of a sand and gravel washing and screening plant equipped with apparatus embodying the principles of the invention.

Fig. 2 is an enlarged fragmentary detail view showing a portion of the screw conveyer by which the sand and gravel and water are caused to have a forward flowing motion in the troughs which lead to each screen, or from one screen to another, or from the last screen to the point of discharge for the sand.

Fig. 3 is a vertical cross section on line 3—3 in Fig. 2.

Fig. 4 is an enlarged side elevation, partly in section, of a portion of said washing and screening apparatus.

As thus illustrated, the invention comprises a horizontal superstructure or housing 1 supported on structural iron uprights 2, so that the platform or track 3 of this housing is a desired distance above the ground. It will also be seen that these uprights 2 are disposed a distance apart to provide storage spaces between them for the piles of gravel or sand. As shown, the washing apparatus comprises three rotary screens 4, 5, and 6, but it will be understood that any suitable number of screens can be employed. The screen 4 is mounted upon the trough 7, which latter is provided with wheels 8 to travel on the rails of the track 3, so that the position of the screen can be varied longitudinally of said track. In a similar manner, the screen 5 is mounted to rotate upon the trough 9, which latter is also provided with wheels 8, and the screen 6 is mounted to rotate on the trough 10, which latter is also provided with wheels 8 to travel on said track. It will be seen that the trough 7 has its discharge end portion 11 slightly elevated to discharge the sand and gravel into the screen 5, and the trough 9 has its forward end portion 10 similarly tilted upward, or elevated, to discharge into the screen 6, and, in this way, the portions of the sand and gravel which are fine enough to pass through the perforations of the screen 4 will be received by the trough 7 and thereafter discharged into the screen 5; and in a similar manner, all portions of the sand and gravel which are fine enough to pass through the perforations of the screen 5 will be received by the trough 9 and thereafter discharged into the screen 6, so that the latter produces the final screening action. The coarse gravel which is too large to pass through the perforations of the screen 4 enter the spout 13 and fall downward to form the pile 14 below the first screen. In a similar manner, the gravel which is too coarse to pass through the perforations of the screen 5 will be discharged from the end of the screen into the spout 14, and will then form the pile 15 in the next space. Finally, the gravel which is too coarse to pass through the finer perforations of the screen 6, (it will be understood that the perforations of the screen 5 are finer than those of the screen 4, and that the perforations of the screen 6 are finer than those of the screeen 5), will be discharged from the end of this screen into the spout 16, and will then fall downward into the third storage space to form the pile 16 below this third screen. The sand and water from the screen 6, which pass through the perforations thereof, will enter the trough 10, and from the elevated end portion 17 of this trough the sand and gravel will finally be discharged into the receiving device 18, which latter may be an automatic settling tank of any known or approved character. The sand then forms the pile 19 in the fourth storage space. A fourth trough 20, similar to those previously described, is provided with an elevated discharge portion 21 to discharge the sand and gravel and water into the receiving end of the first screen 4, and this trough is also provided with wheels 8 to travel on said track. Any suitable means, such as a hopper 22 having a conveyer belt 23 leading thereto, can be employed for conveying the sand and gravel to the receiving end of the trough 20 in a manner what will be readily understood.

Any suitable means, such as a water pipe, can be provided for supplying the necessary quantity of water to the trough 20, and it will also be understood that discharge nozzles connected with the water supply pipes can be arranged to discharge water into the discharge ends of the screens 4, 5 and 6, in order to flush the screens and wash the sand and mud back, so that only gravel of the desired or predetermined size will escape from the discharge end of each screen, the sand and mud being compelled to pass through the perforations of each screen, in the common and well known manner.

In order to cause the forward flowing motion of the sand and gravel and water in the troughs 8, 9, 10, and 20, screw conveyers 24 are disposed in said troughs, being of such diameter (see Figs. 2 and 3), that the sides of the screw or spiral are spaced a distance from the sides and bottom of the troughs, whereby the screw conveyers operate in water, and do not engage the sand and gravel. In this way, the screw conveyers force the water forward in each trough, and this flowing movement of the water drags the sand and gravel along with it, so that the materials are passed successively through the different screens, notwithstanding that the apparatus is disposed in a horizontal position. This also washes the gravel in the troughs, so that in some cases additional water supply or flushing devices will not be necessary for the screens, the powerful churning action of the screw conveyers in the troughs being sufficient to wash the gravel clean.

Any suitable power-transmitting connections, such as overhead shafts and belts, with connections therefrom to the conveyers and screens, can be employed for producing the necessary and proper rotation of the conveyers and screens to produce the desired results. Of course, on the other hand, it is obvious that the spiral or screw conveyers can be suitably connected to the rotary screens, and connected together, so that one long continuous connection is formed, and by rotating this connection at the receiving end of the apparatus the entire structure composed of the rotary conveyers and screens will be rotated in the desired manner, it being obvious that power-transmitting connections can be provided between the screens and the conveyers to cause the screens to rotate either faster or slower than the conveyers, or at such relative speed as may be found proper or necessary or desirable for different situations and different kinds of work.

It will also be seen that, by reason of the tracks and the wheels 8 which support the apparatus thereon, the entire apparatus can be shifted longitudinally of the housing 1, and in this way the piles of gravel and sand can be elongated, like the pile or heap of gravel 25 (see Fig. 4), thereby to more completely fill the storage spaces. If the apparatus were stationary, then each pile or heap of gravel or sand would be cone-shaped, and some considerable portion of the valuable storage space would not be utilized; but by moving the apparatus back and forth on the track the different piles or heaps of the materials can be elongated, until they nearly fill each storage space. Any suitable means or instrumentalities can be employed for shifting the apparatus back and forth or longitudinally of the track.

In addition, it will be seen that a tunnel 26 is provided to extend longitudinally below the storage spaces, and that this tunnel contains a belt conveyer 27, which may lead to a point more or less remote from the washing and screening apparatus. The floor 28 of the different storage spaces is provided with openings 29 through which the materials may be discharged onto the belt 27 and it will be understood that these openings 29 can be provided with gates or controlling devices of any suitable, known, or approved character, and that the discharge of the materials from the bottoms of the piles or heaps can be controlled at will. In this way, any desired quantity of coarse gravel can be discharged onto the belt 27, or any desired portion of the finer grades of gravel, or any desired portion of the sand in the last pile. Whatever is discharged onto the belt will be conveyed to the place where the same is desired for use.

With the foregoing construction, therefore, it will be seen that the washing and screening apparatus is of uniform height, and is kept as low as possible, so that structures of excessive and expensive heights are not required. Furthermore, the storage space is economized, and in addition the delivery of the graded materials to the place where they are to be used is greatly facilitated and expedited. While screw conveyers are shown as the means for forcing or propelling the water and materials from one screen to the next, or to the first screen, or from the last screen, it is obvious that this can be done by any suitable, known or approved means and in any suitable or desired manner. In other words, means of any kind can be employed for forcing the water and materials through the conduits, from one screen to the next, or to the first screen or from the last screen, whereby the necessity of using an inclined arrangement of the apparatus, so that water and materials will flow by gravity, is obviated.

Also, it will be understood, of course, that while the apparatus shown and described is provided with the wheels 8 to permit longitudinal shifting of the apparatus, to spread or elongate the piles or heaps of graded materials, it is obvious that these wheels may be omitted so that the apparatus will be stationary. In some cases also, each screw conveyer, or other device or means for propelling the water and materials in the conduits, may be operated by an electrical motor applied to the end thereof, these motors, such as the motors 30, in Fig. 4, being also suitably connected to rotate the screens, through the medium of any suitable power transmitting connections. Of course, when the wheels 8 are employed, the trough or conduit 20 must be long enough to extend under the hopper 22 in any position to which the apparatus may be shifted, said hopper being supported in a stationary position, and the trough or conduit being movable longitudinally below the feed opening in the bottom of the hopper.

What I claim as my invention is:—

1. In a gravel washing and screening apparatus, the combination of a plurality of rotary screens for grading the materials from coarse to fine disposed at intervals in the same level or horizontal plane, with inclined axes for said screens, means for rotating said screens, and conveyors to connect the screens together, whereby to wash and hydraulically convey the gravel from one screen to another, and whereby the gravel is graded from coarse to fine and reduced by successive screening operations to as many sizes as there are screens.

2. In a gravel washing and screening apparatus, a structure as specified in claim 1, said conveyers comprising horizontally disposed troughs having screw conveyers therein, with space between the sides of the screws and the sides and bottom of the troughs, and with the discharge end of each trough disposed higher than the receiving end thereof.

3. In a gravel washing and screening apparatus, a structure as specified in claim 1, the discharge end of each conveyer being higher than the receiving end thereof, so that the water and materials travel up hill in passing from below one inclined screen to the receiving end of the other.

4. In a gravel washing and screening apparatus, a structure as specified in claim 1, said conveyers comprising horizontally disposed troughs upon which said screens are mounted, with the discharge end of each trough tilted upward to properly discharge into the next screen, a track, and wheels to support said troughs on said track, the entire apparatus being movable longitudinally on said track to elongate the heaps of materials formed by the different screens.

5. In a gravel washing and screening apparatus, a structure as specified in claim 1, said conveyers comprising horizontally disposed troughs disposed below the screens, each trough having an upwardly inclined discharge end disposed at an angle to the horizontal main portion of the trough, and devices in said troughs to propel the water and materials from one screen to the next screen.

6. In a gravel washing and screening apparatus, the combination of a plurality of screens for successively screening the materials, means for operating said screens, and a water and gravel conveyor leading from the bottom of one screen to the receiving end of the next screen, the discharge end of said conveyor being higher than the receiving end thereof, so that the water and materials travel up hill in passing from below one screen to the receiving end of the other screen.

7. In a gravel washing and screening apparatus, a structure as specified in claim 6, in combination with a similar conveyer for feeding the water and materials to the first screen, and a similar conveyer for receiving the water and fine materials, after the elimination of the coarse materials therefrom, from the perforations of the last screen.

8. In a gravel washing and screening apparatus, a structure as specified in claim 6, said conveyer comprising a trough and a screw conveyer therein.

9. In a gravel washing and screening apparatus, the combination of a horizontally disposed support for said apparatus, means for operating said apparatus to wash and screen the materials, means whereby said apparatus is movable bodily and longitudinally on said support, thereby to elongate the heap or heaps of materials formed by the discharge of sized gravel from the screening means of said apparatus, and a structure for supporting said horizontal support in a suitably elevated position to provide the requisite space below said heap or heaps of materials.

10. In a gravel washing and screening apparatus, the combination of a series of rotary screens for grading the materials, means for rotating said screens, means for conveying the materials from one screen to the next screen, a track extending over the storage area, and wheels to support said screens and conveying means on said track, said apparatus being movable bodily and longitudinally on said track so that said screens are movable endwise substantially in the direction of their axes of rotation, thereby to elongate the heaps of materials formed below said screens.

11. In a gravel washing and screening apparatus, the combination of a rotary screen, a trough to receive the materials from the perforations of said screen, with an upward deflection for the discharge end of said trough, and a screw conveyor substantially centered in said trough to propel the water along the bottom of the trough, with spaces between the screw and the sides and bottom of the trough, and under the screw, to provide ample clearance for the materials, so that the gravel is washed along by the water.

12. In a gravel washing and screening apparatus, the combination of a rotary screen, a trough leading thereto, with an upward deflection for the discharge end of said trough, and a screw conveyor substantially centered in said trough, with clearance between the screw and the trough, to propel the water and thereby wash the materials along the bottom of the trough to the receiving end of said screen.

13. In an apparatus of the character described, the combination of overhead means substantially as described for forming a heap of materials, a flat floor for said heap of loose materials, with a row of openings in said floor, a tunnel below said floor, and a belt conveyor in said tunnel to receive the discharge from said openings.

14. A structure as specified in claim 13, in combination with means for forming one or more similar heaps of loose materials, and a similar floor for each additional heap, said floors being disposed in series, one after the other, above said belt.

15. In a gravel washing and screening apparatus, the combination of a plurality of screens for performing successive screening operations, a conduit leading from below one screen to the receiving end of the next screen, so that the finer materials pass through the perforations of the screen and into said conduit, while the coarser materials are discharged from the end of each screen, thus grading the gravel from coarse to fine, and inclined means in said conduit to force the water along therein from one screen and up hill to the other, so that the water in turn will wash the materials along also.

16. In a gravel washing and screening apparatus, a structure as specified in claim 15, the discharge end of said conduit being higher than the receiving end thereof, so that the water and materials are compelled to travel up hill in passing from one screen to the other, and whereby the screens may be arranged in the same level or horizontal plane.

17. In a gravel washing and screening apparatus, the combination of a screen, a conduit leading to said screen, thereby to feed water and materials thereto, means whereby said conduit is movable endwise, and means inclined in said conduit to force the water along therein and up hill to said screen.

18. In a gravel washing and screening apparatus, the combination of a screen, a conduit leading from below said screen, thereby to take the water and materials away from said screen, means whereby said conduit with the water therein is movable endwise, and means in said conduit to force the water along therein and away from said screen.

19. In a gravel washing and screening apparatus, the combination of a plurality of rotary screens disposed in the same horizontal plane with the axes of said screens tilted forward in the direction of travel of the materials, and conveyers to connect the screens together, said conveyers comprising horizontally disposed troughs having screw conveyers therein with space between the sides of the screws and the sides and bottom of the troughs, and with the discharge end of each trough disposed higher than the receiving end thereof.

20. In a gravel washing and screening apparatus, the combination of a plurality of rotary screens disposed in the same horizontal plane, and conveyers to connect the screens together, said conveyers including horizontally disposed troughs upon which said screens are mounted, with conveying means in said troughs and the discharge end of each trough tilted upward to properly discharge into the next screen, a track, and wheels to support said troughs on said track, the entire apparatus being movable longitudinally on said track to elongate the heaps of materials formed by the different screens.

21. In a gravel washing and screening apparatus, the combination of a plurality of rotary screens disposed in the same horizontal plane with the axes of said screens tilted forward in the direction of travel of the materials, and conveyers to connect the screens together, said conveyers comprising horizontally disposed troughs disposed below the screens, each trough having an upwardly inclined discharge end disposed at an angle to the horizontal main portion of the trough, and devices in said troughs to propel the water and materials from one screen to the next screen.

22. In a gravel washing and screening apparatus, the combination of a plurality of rotary screens disposed in the same horizontal plane, and conveyors to connect the screens together, said conveyors comprising horizontally disposed troughs having screw conveyors therein, with space between the sides of the screws and the sides and bottom of the troughs, and with the discharge end of each trough disposed higher than the receiving end thereof.

23. In a gravel washing and screening apparatus, the combination of a plurality of rotary screens disposed in the same horizontal plane, and conveyors to connect the screens together, the discharge end of each conveyor being higher than the receiving end thereof, so that the water and materials travel up hill in passing from below one inclined screen to the receiving end of the other.

24. In a gravel washing and screening apparatus, the combination of a plurality of rotary screens disposed in the same horizontal plane, and conveyors to connect the screens together, said conveyors comprising horizontally disposed troughs upon which said screens are mounted, with the discharge end of each trough tilted upward to properly discharge into the next screen, a track, and wheels to support said troughs on said track, the entire apparatus being movable longitudinally on said track to elongate the heaps of materials formed by the different screens.

25. In a gravel washing and screening apparatus, the combination of a plurality of rotary screens disposed in the same horizontal plane, and conveyors to connect the screens together, said conveyors comprising horizontally disposed troughs disposed below the screens, each trough having an upwardly inclined discharge end disposed at an angle to the horizontal main portion of the trough, and devices in said troughs to propel the water and materials from one screen to the next screen.

26. In a gravel washing and screening apparatus, the combination of a plurality of screens for successively screening the materials, and a conveyor leading from one screen to the next screen, the discharge end of said conveyor being higher than the receiving end thereof, so that the water and materials travel up hill in passing from one screen to the other, in combination with a similar conveyor for feeding the water and materials to the first screen, and a similar conveyor for receiving the water and fine materials, after the elimination of the coarse materials therefrom, from the perforations of the last screen.

27. In a gravel washing and screening apparatus, the combination of a plurality of screens for successively screening the materials, and a conveyor leading from one screen to the next screen, the discharge end of said conveyor being higher than the receiving end thereof, so that the water and materials travel up hill in passing from one screen to the other, said conveyor comprising a trough and a screw conveyor therein.

Signed by me at Chicago, Illinois, this 15th day of May, 1918.

RAYMOND W. DULL.